Jan. 7, 1936.    F. C. RUNYAN    2,027,202
SELF ADJUSTING BRAKE
Filed March 21, 1935
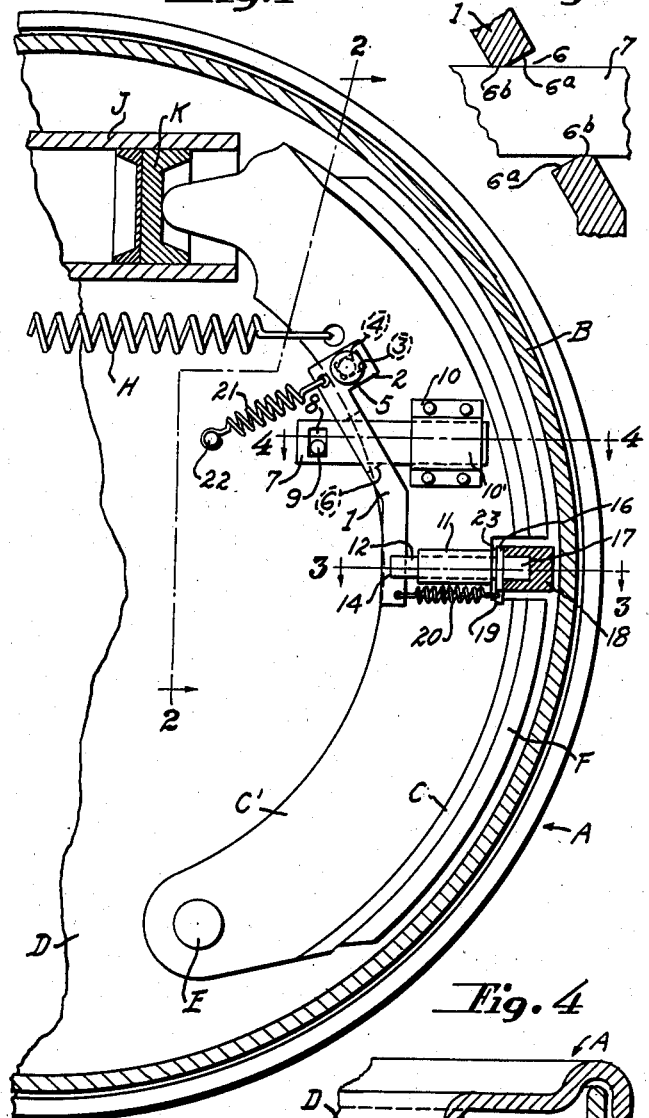
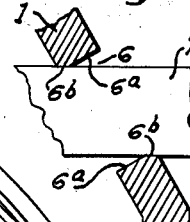
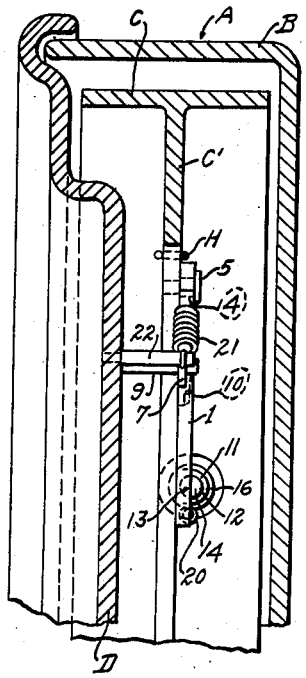
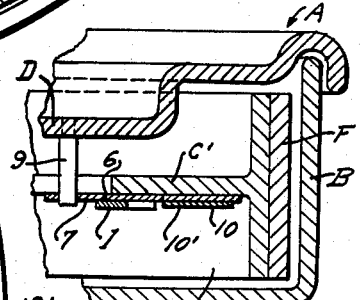
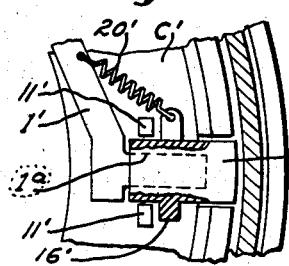
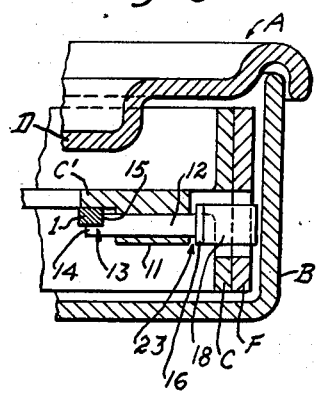
INVENTOR
F. C. RUNYAN
BY E. M. Harrington
ATTORNEY Patented Jan. 7, 1936

2,027,202

UNITED STATES PATENT OFFICE 2,027,202

SELF-ADJUSTING BRAKE

Frank C. Runyan, Overland, Mo.

Application March 21, 1935, Serial No. 12,140

10 Claims. (Cl. 188—79.5)

This invention relates generally to brakes, and more specifically to a brake of the type which includes a brake drum or equivalent element into and out of contact with which brake shoes or other braking members are moved, the predominant object of the invention being to provide an improved brake of this general type which has associated therewith means for automatically adjusting the "off" positions of the shoes or other braking members so as to maintain predetermined precise clearance between the shoes or other braking members and the brake drum or equivalent element, regardless of wear of the parts or expansion and contraction of the brake drum or equivalent element caused by heating and cooling thereof.

Prior to this invention considerable effort was made to produce a brake structure, the shoes of which were automatically adjustable in a manner to maintain predetermined clearance between the shoes and the brake drum, and while these efforts were successful in many cases in so far as the limited result of automatic movement of the shoes toward the brake drum was concerned, the producers of these automatically adjusted brake structures overlooked one extremely important factor which prevented such structures from operating with the required efficiency. The factor referred to is the fact that brake drums become heated as a result of repeated and long application of the brake, and because of such heating of the brake drums and the subsequent cooling thereof the drums expand and contract.

The adjustment of the brake shoes relative to the brake drum in the case of each automatically adjusted brake structure with which I am familiar is in response to increase of the movement of the brake shoes relative to the brake drum, and this increase of movement may result from wear of the brake linings or expansion of the brake drum. When, in the operation of these previously known structures, the movement of the brake shoes was increased, the "off" positions of the shoes were automatically adjusted toward the brake drum to re-establish the proper clearance between the brake shoes and the brake drum. This arrangement worked out successfully in so far as increase of movement of the shoes due to wear of the brake linings was concerned, but when the increase of movement was due to expansion of the drum, difficulties were encountered which rendered these previously known automatically adjustable structures entirely ineffective for general use. These difficulties arose from the fact that as the shoe movement was increased due to expansion of the drum, the shoes were automatically adjusted outwardly to maintain the proper clearance between the shoes and the expanded drum, and then when the drum cooled, and contracted relative to the shoes as a result of such cooling, the clearance was decreased in proportion to the degree of contraction of the drum, with the result that the proper clearance between the shoes and the drum was not present, and frequently clearance was entirely eliminated, with the result that the drum and shoes were positively locked together.

The brake structure disclosed herein is so constructed and arranged that when the movement of the shoes relative to the drum is increased due to wear of the brake linings or expansion of the drum, the "off" positions of the shoes are automatically adjusted outwardly so as to re-establish the proper clearance. However, when the increase of the shoe movement is due to expansion of the drum and the drum subsequently contracts due to cooling thereof, the structure disclosed herein operates in a manner to readjust the shoes so as to re-establish the proper clearance between the shoes and the contracted drum.

Fig. 1 is a fragmentary, sectional view illustrating a brake structure constructed and arranged in accordance with this invention.

Fig. 2 is a sectional view taken approximately on line 2—2 of Fig. 1.

Fig. 3 is a sectional view taken approximately on line 3—3 of Fig. 1.

Fig. 4 is a sectional view taken approximately on line 4—4 of Fig. 1.

Fig. 5 illustrates a modified form of the invention.

Fig. 6 is an enlarged, fragmentary view, partly in section and partly in elevation, of a part of the improved brake structure.

In the drawing, wherein are shown for the purpose of illustration, merely, two embodiments of the invention, A designates the improved brake structure generally, said brake structure including a brake drum B of ordinary and well known construction and arrangement, which is arranged in the usual manner for rotary movement with a wheel or other element to which braking action is to be applied. Arranged within the brake drum B are brake shoes C (only one thereof being shown in the drawing), said brake shoes being pivotally supported by a backing plate D, as indicated at E in Fig. 1. The brake shoe C shown in Fig. 1 is provided with a brake lining F, and said brake shoe and its companion shoe, which is not illustrated, are drawn to their "off" positions by a coil spring H. The particular brake structure illustrated in the drawing is hydraulically operated, said structure including a wheel cylinder J provided with piston means K movable in response to pressure on a brake pedal (not shown), so as to operate the shoes and move the brake linings thereof into braking contact with the braking face of the brake drum.

Supported by the brake shoe C illustrated in Fig. 1 in contact with the web portion C' thereof is an angularly shaped gripping element 1, which at its upper end is provided with an extended portion 2 in which an elongated opening 3 is formed. Extended through the opening 3 referred to is a pin 4 which is provided with an enlarged head 5 that contacts loosely with the outer face of the gripping element 1. The pin 4 at the end opposite to the headed end thereof is of reduced diameter, and this reduced portion of the pin is screwed, riveted, or otherwise fixedly located in an opening formed in the web portion of the shoe C, the shoulder between the full diameter portion of the pin and the reduced diameter portion thereof contacting with a face of said web portion of the shoe. The gripping element 1 is provided with an opening 6 which is open at opposite sides of the element, as shown most clearly in Fig. 6. This opening 6 is open also at the rear face of the element 1, or, in other words, the face thereof which contacts with the web portion of the shoe, and is closed at the forward face of the gripping element by a portion of the element.

Supported by the shoe C is a bar 7 which at one end is provided with a vertically elongated opening 8, this elongated opening having a pin 9 extended therethrough which is rigidly supported by and extends from the backing plate D, as shown in Fig. 4. At its opposite end the bar 7 is loosely extended through a metallic strap 10, which is fixedly attached to the web portion of the shoe, said strap being provided with an outwardly formed portion 10' which embraces the bar 7. The bar 7 contacts with a face of the web portion of the shoe C, and said bar passes through the opening 6 formed in the angular gripping element 1. It is important to note that the top and bottom walls of the opening 6 of the gripping element 1 include portions 6a which are disposed at a substantial right angle relative to the opposite side faces of said gripping element, and gripping faces 6b which are substantially parallel with respect to the top and bottom faces of the bar 7 (Fig. 6).

At a point beneath the location of the metallic strap 10 the web portion of the shoe C is provided with a boss 11 which slidingly supports a rod 12. At its inner end this rod is cut away, as indicated at 13 in Figs. 2 and 3, to provide a portion 14 of reduced thickness which overlies the gripping element 1 adjacent to the lower end thereof, and at the point where this reduced portion of the rod joins the full diameter portion thereof a shoulder 15 is provided, which, when the brake shoe is in the "off" position, contacts with a side face of the gripping element 1 (Fig. 3). At its opposite end the rod 12 is provided with a head portion comprising an annular flange 16 and an extended portion 17, and this head portion supports a drum-contacting element 18. Preferably this drum-contacting element 18 is formed of a material which will wear a slight degree more rapidly than the brake lining F of the shoe. The annular flange 16 of the rod 12 is provided with an extension 19 (Fig. 1) to which a coil spring 20 is attached, the opposite end of said coil spring being connected to the lower end portion of the gripping element 1. At the end of the gripping element 1 opposite to the end thereof at which the coil spring 20 is attached a coil spring 21 is arranged, which is connected to said end portion of the gripping element and to a pin 22 extended from the backing plate D.

In considering the operation of the improved braking structure disclosed herein, it is to be noted that when the shoe C is in its "off" position the pin 4 is in contact with the inner wall of the elongated opening 3, as shown in Fig. 1. Also, at such time the shoulder 15 of the rod 12 is in contact with a side face of the gripping element 1, while a space 23 is present between the outer end face of the boss 11 and the annular flange 16 of the rod 12. It is also important to note that the space between the forward portion of the pin 4 and the forward wall of the elongated opening 3 is the same as the predetermined clearance between the outer face of the brake lining and the inner face of the drum with which the brake lining contacts during application of the brake, ten one-thousandths of an inch, for instance, while the space 23 between an end of the boss 11 and the annular flange 16 of the rod 12 is less than the space mentioned, or approximately seven one-thousandths of an inch. Likewise, it is to be noted that when the brake shoe is in the "off" position the drum-contacting element 18 extends beyond the outer face of the brake lining F of the shoe so that its outer drum-contacting face is spaced approximately three one-thousandths of an inch from the inner face of the drum.

The coil spring 21 tends to draw the upper end of the gripping element 1 inwardly, and as a result thereof the faces 6b of the opening 6 of the gripping element grip the top and bottom faces of the bar 7 tightly, so there can be no relative movement between the upper end portion of the gripping element and said bar 7. Assume, now, that the shoe C is moved toward the braking face of the brake drum by pressure on a brake pedal associated with the braking structure. The bar 7 is held immovable by the pin 9 which is fixed to the backing plate, and the gripping element is in tight gripping engagement with said bar, hence the pin 4 which is carried by the shoe will move longitudinally through the elongated opening 3 of the gripping element. The space between the forward portion of the pin 4 and the forward wall of the elongated opening 3 is ten one-thousandths of an inch, the same as the clearance between the brake lining and the braking face of the drum, hence if no wear is produced by application of the brake lining to the brake drum the braking action will be performed without changing the position of the gripping element 1. Also, when the brake shoe is moved toward the brake drum as described, the seven one-thousandths of an inch space 23 will be initially taken up, after which the drum-contacting element will be moved an additional three one-thousandths of an inch into contact with the braking face of the drum. This three one-thousandths of an inch movement of the drum-contacting element causes the shoulder 15 of the rod 12 to be moved three one-thousandths of an inch away from the face of the gripping element with which it normally contacts, but this does not result in movement of the gripping element due to the fact that said gripping element is in gripping engagement with the bar 7.

Assume, however, that wear has taken place when the brake lining is applied to the braking face of the brake drum. In this event the shoe will be compelled to move more than the predetermined ten one-thousandths of an inch to properly set the brake, and during this additional movement of the brake shoe the upper end of the gripping element 1 will be carried forwardly by the pin 4 in contact with the forward wall of the elongated opening 3. This forward movement of the gripping element relieves the grip between the gripping element and the bar 7 and permits the gripping faces 6ᵇ to slide longitudinally of the top and bottom faces of said bar. Now, when the pressure on the brake pedal is relieved the coil spring 21 will again draw the gripping faces 6ᵇ into gripping contact with the bar 7 but at the advance points thereof to which they have been moved by the additional movement necessary to set the brake, and the rearward movement of the shoe will be arrested by the pin 4 contacting with the inner wall of the elongated opening, which is the "off" position stop of the shoe, at a point closer to the drum than was previously the case.

Thus, as the brake lining is subjected to wear by application of the brake, the inner wall of the elongated opening of the gripping element which constitutes the "off" position stop of the shoe is automatically adjusted toward the braking face of the brake drum to compensate for the wear, whereby a precise clearance between the outer surface of the brake lining and the braking face of the drum is maintained at all times.

Thus far in this description of the operation of the invention additional movement of the brake shoe C, because of wear of the brake lining alone, has been referred to as the cause of additional movement of the shoe toward the drum. Such additional shoe movement is caused also by expansion of the drum as the result of heating due to repeated or long application of the brake. When the brake drum B expands the shoes are adjusted outwardly toward the braking face of the drum in the manner already explained in connection with the wearing away of the brake linings, so as to maintain the proper clearance between the brake linings and the drum. The expanded drum naturally contracts when it cools, and when this contraction takes place the contracting drum contacts with the drum contacting element 18 and continued contraction of the drum moves the rod 12 inwardly. This inward movement of the rod 12 moves the lower end portion of the gripping element 1 inwardly, thereby relieving the gripping action between the gripping element 1 and the bar 7, and permitting the spring H to draw the shoe C rearwardly relative to the drum and the spring 21 to draw the gripping element 1 into gripping relation with the bar 7 at a different rearward position.

Thus proper clearance is maintained at all times between the brake shoes and the braking face of the brake drum, whether the additional movement of the shoes be the result of wearing away of the brake linings or expansion of the drum. Also, when the brake shoes are adjusted outwardly as a result of expansion of the brake drum and said drum contracts due to cooling thereof, the shoe-adjusting mechanism is readjusted to again provide the proper clearance between the shoes and the contracted drum.

In Fig. 5 I have shown a modified form of the invention in accordance with which the drum-contacting element 18' is supported by an extension 1ᵃ formed on the gripping element 1'. In this form of the invention the shoe C' is provided with abutments 11' which contact with an abutment 16' formed on the drum-contacting element 18' so as to move said drum-contacting element toward the drum with the shoe. Also, the drum-contacting element is connected to the gripping element by a coil spring 20'. The operation of the mechanism shown in Fig. 5 is substantially the same as that of the corresponding parts illustrated in Fig. 1.

While I have shown only one brake shoe in Fig. 1, it is to be understood that each brake shoe of a braking structure will be provided with the shoe-adjusting mechanism illustrated in Fig. 1.

I claim:

1. A brake comprising a brake drum, a brake shoe movable toward and from said brake drum, a brake lining, said brake shoe being so arranged that predetermined clearance is present between said brake shoe and said brake drum when the brake shoe is in inactive position, automatically adjusted means including elements capable of relative movement for maintaining said predetermined clearance as the degree of movement of the brake shoe toward the braking position is increased because of wearing away of the brake lining or expansion of the brake drum, and means for automatically re-adjusting said automatically adjusted means when said brake drum contracts after expansion thereof, the last-mentioned means during readjustment of said automatically adjusted means acting to change the relative positions of said relatively movable elements of said automatically adjusted means.

2. A brake comprising a brake drum, a brake shoe movable toward and from said brake drum, a brake lining, said brake shoe being so arranged that predetermined clearance is present between said brake shoe and said brake drum when the brake shoe is in inactive position, automatically adjusted means including elements capable of relative movement for maintaining said predetermined clearance as the degree of movement of the brake shoe toward the braking position is increased because of wearing away of the brake lining or expansion of the brake drum, and means actuated by said brake drum for automatically re-adjusting said automatically adjusted means when said brake drum contracts after expansion thereof, the last-mentioned means during readjustment of said automatically adjusted means acting to change the relative positions of said relatively movable elements of said automatically adjusted means.

3. A brake comprising a brake drum, a brake shoe movable toward and from said brake drum, a brake lining associated with said brake shoe, said brake shoe being so arranged that predetermined clearance is present between said brake lining and said brake drum when the brake shoe is in inactive position, automatically adjusted means for maintaining said predetermined clearance as the degree of movement of the brake shoe toward the braking position is increased because of wearing away of the brake lining or expansion of the brake drum, and means including an element movable into and out of contact with said brake drum for automatically re-adjusting said automatically adjusted means in response to movement imparted thereto by contraction of the brake drum after expansion thereof.

4. A brake comprising a brake drum, a brake shoe movable toward and from said brake drum, a brake lining associated with said brake shoe, said brake shoe being so arranged that predetermined clearance is present between said brake lining and said brake drum when the brake shoe is in inactive position, automatically adjusted means for maintaining said predetermined clearance as the degree of movement of the brake shoe toward the braking position is increased because of wearing away of the brake lining or expansion of the brake drum, and means including an element movable with said shoe into and out of contact with said brake drum for automatically re-adjusting said automatically adjusted means in response to movement imparted thereto by contraction of the brake drum after expansion thereof.

5. A brake comprising a brake drum, a brake shoe movable toward and from said brake drum, a brake lining associated with said brake shoe, said brake shoe being so arranged that predetermined clearance is present between said brake lining and said brake drum when the brake shoe is in inactive position, automatically adjusted means for maintaining said predetermined clearance as the degree of movement of the brake shoe toward the braking position is increased because of wearing away of the brake lining or expansion of the brake drum, and means including an element carried by said shoe and movable therewith into and out of contact with said brake drum for automatically re-adjusting said automatically adjusted means in response to movement imparted thereby by contraction of the brake drum after expansion thereof.

6. A brake comprising a brake drum, a brake shoe movable toward and from said brake drum, a brake lining, said brake shoe being so arranged that predetermined clearance is present between said brake shoe and said brake drum when the brake shoe is in inactive position, automatically adjusted means including elements capable of relative movement for maintaining said predetermined clearance as the degree of movement of the brake shoe toward the braking position is increased because of wearing away of the brake lining or expansion of the brake drum, and means for automatically re-adjusting said automatically adjusted means when said brake drum contracts after expansion thereof, said readjusting means during readjustment of said automatically adjusted means acting to change the relative positions of said relatively movable elements of said automatically adjusted means, said automatically adjusted means and the means for re-adjusting same being supported by said shoe.

7. A brake comprising a brake drum, a brake shoe movable toward and from said brake drum, a brake lining associated with said brake shoe, said brake shoe being so arranged that predetermined clearance is present between said brake lining and said brake drum when the brake shoe is in inactive position, automatically adjusted means for maintaining said predetermined clearance as the degree of movement of the brake shoe toward the braking position is increased because of wearing away of the brake lining or expansion of the brake drum said means including a member relative to which the brake shoe moves, a gripping element supported by said brake shoe and adapted to grip said member, an abutment carried by said brake shoe and adapted to contact with an abutment face on said gripping element which provides the inactive position stop for the brake shoe, said gripping element being adjusted relative to said member in response to excessive movement of said brake shoe toward the braking position, and means for automatically re-adjusting said automatically adjusted means when said brake drum contracts after expansion thereof.

8. A brake comprising a brake drum, a brake shoe movable toward and from said brake drum, a brake lining associated with said brake shoe, said brake shoe being so arranged that predetermined clearance is present between said brake lining and said brake drum when the brake shoe is in inactive position, automatically adjusted means for maintaining said predetermined clearance as the degree of movement of the brake shoe toward the braking position is increased because of wearing away of the brake lining or expansion of the brake drum, said means including a member relative to which the brake shoe moves, a gripping element supported by said brake shoe and adapted to grip said member, and abutment carried by said brake shoe and adapted to contact with an abutment face on said gripping element which provides the inactive position stop for the brake shoe, said gripping element being adjusted relative to said member in response to excessive movement of said brake shoe toward the braking position, and means including an element movable into and out of contact with said brake drum for automatically re-adjusting said automatically adjusted means in response to movement imparted thereto by contraction of the brake drum after expansion thereof.

9. A brake comprising a brake drum, a brake shoe movable toward and from said brake drum, a brake lining associated with said brake shoe, said brake shoe being so arranged that predetermined clearance is present between said brake lining and said brake drum when the brake shoe is in inactive position, automatically adjusted means for maintaining said predetermined clearance as the degree of movement of the brake shoe toward the braking position is increased because of wearing away of the brake lining or expansion of the brake drum, said means including a member relative to which the brake shoe moves, a gripping element supported by said brake shoe and adapted to grip said member, an abutment carried by said brake shoe and adapted to contact with an abutment face on said gripping element which provides the inactive position stop for the brake shoe, said gripping element being adjusted relative to said member in response to excessive movement of said brake shoe toward the braking position and means including an element movable with said shoe into and out of contact with said brake drum for automatically re-adjusting said automatically adjusted means in response to movement imparted thereto by contraction of the brake drum after expansion thereof.

10. A brake comprising a brake drum, a brake shoe movable toward and from said brake drum, a brake lining associated with said brake shoe, said brake shoe being so arranged that predetermined clearance is present between said brake lining and said brake drum when the brake shoe is in inactive position, automatically adjusted means for maintaining said predetermined clearance as the degree of movement of the brake shoe toward the braking position is increased because of wearing away of the brake lining or expansion of the brake drum, said means including a member relative to which the brake shoe moves, a gripping element supported by said brake shoe and adapted to grip said member, an abutment carried by said brake shoe and adapted to contact with an abutment face on said gripping element which provides the inactive position stop for the brake shoe, said gripping element being adjusted relative to said member in response to excessive movement of said brake shoe toward the braking position, and means including an element movable with said shoe into and out of contact with said brake drum and adapted to impart movement to said gripping element for automatically re-adjusting said automatically adjusted means in response to movement imparted thereto by contraction of the brake drum after expansion thereof.

FRANK C. RUNYAN.